United States Patent
Beaulaton et al.

(10) Patent No.: US 10,401,171 B2
(45) Date of Patent: Sep. 3, 2019

(54) SYSTEM COMPRISING A MECHANICAL RESONATOR AND METHOD THEREFOR

(71) Applicant: NXP USA, Inc., Austin, TX (US)

(72) Inventors: Hugues Beaulaton, Toulouse (FR); Philippe Patrick Calmettes, Garidech (FR); Thierry Dominique Yves Cassagnes, Tournefeuille (FR)

(73) Assignee: NXP USA, Inc., Austin, TX (US)

( * ) Notice: Subject to any disclaimer, the term of this patent is extended or adjusted under 35 U.S.C. 154(b) by 90 days.

(21) Appl. No.: 15/662,771

(22) Filed: Jul. 28, 2017

(65) Prior Publication Data

US 2017/0328713 A1  Nov. 16, 2017

Related U.S. Application Data

(63) Continuation-in-part of application No. 14/794,894, filed on Jul. 9, 2015, now abandoned.

(30) Foreign Application Priority Data

Feb. 9, 2015  (WO) .................. WO/IB2015/000267

(51) Int. Cl.
*G01C 19/5726* (2012.01)
*G01C 19/5762* (2012.01)

(52) U.S. Cl.
CPC ..... *G01C 19/5726* (2013.01); *G01C 19/5762* (2013.01)

(58) Field of Classification Search
CPC ........................ G01C 19/5726; G01C 19/5776
See application file for complete search history.

(56) References Cited

U.S. PATENT DOCUMENTS

| 7,290,435 B2 | 11/2007 | Seeger et al. |
| 2011/0192226 A1 | 8/2011 | Hayner et al. |

*Primary Examiner* — John E Chapman, Jr.

(57) ABSTRACT

A system is provided that includes a mechanical resonator, and an analog circuit coupled to the mechanical resonator. The analog circuit is arranged to receive a mechanical resonator measurement signal having a quadrature error from the mechanical resonator, and to extract a quadrature error signal from the mechanical resonator measurement signal using a quadrature clock. A digital quadrature controller is coupled to the analog circuit and is arranged to generate a quadrature error compensation signal from the extracted quadrature error signal and apply the quadrature error compensation signal to the mechanical resonator or the mechanical resonator measurement signal to reduce quadrature error in the mechanical resonator measurement signal error.

17 Claims, 6 Drawing Sheets

SYSTEM COMPRISING A MECHANICAL RESONATOR AND METHOD THEREFOR

CROSS REFERENCE TO RELATED APPLICATION(S)

This application is a continuation-in-part of co-pending U.S. application Ser. No. 14/794,894, filed on Jul. 9, 2015, herein incorporated by reference.

FIELD OF THE INVENTION

The field of this invention relates to a mechanical resonator for use within a system, such as a micro-electro-mechanical-system (MEMS) device, and method therefor. The invention is applicable to, but not limited to, a mechanism for reducing or compensating for any quadrature error generated in the system, for example at boot-up of the MEMS device.

BACKGROUND OF THE INVENTION

A vibrating micro-electro-mechanical-system (MEMS) gyroscope is one application of a mechanical resonance system and is often used where an angular rotation rate is to be measured. A vibrating MEMS gyroscope includes a movable gyroscope mass (sometimes referred to as a proof mass) that is connected by springs to a substrate. A drive force applied to the proof mass provokes and maintains a constant linear momentum of the proof-mass along a driving position axis, which is needed to generate a Coriolis force 'Fc'. Coriolis effect is based on conservation of momentum, whereby the Coriolis force 'Fc' is proportional to the product of the proof-mass 'm', the input rate 'Ω', the proof mass velocity 'v', and the proof mass's angular rate of rotation perpendicular to the direction of movement of the proof mass. The Coriolis force acting on the proof mass, in the presence of an angular rotation, can be induced using a capacitive force by applying a voltage to capacitor plates of a drive actuation unit. In response to the induced force, the proof mass is moved.

An induced drive force can be supplied and controlled using a drive actuation unit, a drive measurement unit and associated circuitry, which in combination is sometimes referred to as a drive-mode oscillator. The drive actuation unit typically includes a capacitive coupling along the driving position axis between a capacitor plate on the substrate and an opposite capacitor plate on the proof mass.

The drive measurement unit includes a similar pair of capacitor plates. The capacitance between the capacitor plates of the drive measurement unit can be measured and is related to a displacement of the proof mass along a sensing position axis that is perpendicular to the driving position axis. Measurement of the displacement of the proof mass along the sensing position axis can be used to obtain a measure of the Coriolis force and thus a measure of the angular rate of rotation.

A sense measurement unit is also sometimes provided, which, similar to the drive measurement unit, can include a capacitive coupling along the sensing position axis between a sense capacitor plate on the substrate and an opposite sense capacitor plate on the movable proof mass. The sense measurement unit can measure any induced sinusoidal Coriolis force due to a combination of the drive oscillation and any angular rate input. The capacitance between the sense capacitor plates of the sense measurement unit is measured as a sense measurement signal and forms an indication of the displacement of the proof mass along the sensing position axis.

FIG. 1 illustrates a series of drive activation waveforms 100. A first drive activation waveform 110 represents an ideal case, whereby the displacement of the proof-mass is an oscillation along the drive position axis, as illustrated. A second drive activation waveform 170 represents a situation when an angular rate is applied. Here, a displacement is measured on the sense position axis, where the measured displacement is proportional to the Coriolis force. A third drive activation waveform 140 represents the effect of a non-ideal mechanical manufacturing process, or an effect introduced by external stress, whereby the drive proof-mass is forced to not oscillate exactly along the drive position axis. In addition, in this scenario, the drive proof-mass generates a signal along the sense position axis. This additional (undesired) signal waveform is often referred to as a 'quadrature error' as the signal waveform is 90° phase shifted from a measurement signal waveform in the ideal case. Thus, the quadrature error of the additional signal is proportional to the displacement of the drive mass, whereas the Coriolis force is proportional to the velocity of the drive mass.

U.S. Pat. No. 7,290,435 B2 describes a way to compensate for mechanical quadrature errors by determining a digital code at a production stage, storing the digital code in a non-volatile memory in a one-time programmable (OTP) manner and using the digital code to set an amplitude of a quadrature error compensating signal. Hence, the solution proposed in U.S. Pat. No. 7,290,435 suffers from practical limitations when applied in the field, particularly in that a quadrature error compensating signal is only identified during the production stage of the MEMS gyroscope.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Embodiments of the present invention provide for a digital quadrature controller introduced into a system employing a mechanical resonator, such as MEMS device having a MEMS proof mass. The system includes an analog circuit, coupled to the mechanical resonator, which is arranged to receive a mechanical resonator measurement signal having a quadrature error from the mechanical resonator, and extract the quadrature error signal from the mechanical resonator measurement signal using a quadrature clock. The digital quadrature controller is arranged to generate a quadrature error compensation signal from the extracted quadrature error signal. A quadrature error compensation signal is applied to the mechanical resonator or the mechanical resonator measurement signal to reduce quadrature error in the mechanical resonator measurement signal.

In contrast to the known prior art of U.S. Pat. No. 7,290,435, where a quadrature compensating signal solution is only identified during a one-time programming operation performed at the production stage of the MEMS gyroscope, embodiments of the present invention propose that the MEMS system itself extracts a quadrature error signal from the mechanical resonator measurement signal using a quadrature clock. Thereafter, the digital quadrature controller identifies and generates a quadrature error compensation signal that can be advantageously applied to the mechanical resonator or the mechanical resonator measurement signal to reduce quadrature error in the mechanical resonator measurement signal. In some embodiments, the generation of a quadrature error compensation signal can be performed, for example, when the system is not measuring a Coriolis force. Similarly, a compensation signal to reduce any quadrature error can be applied when the system is not measuring a Coriolis force, and therefore whilst the system is operational in the field. In an exemplary embodiment, the MEMS system itself can identify and generate a quadrature error compensation signal to be applied at system boot.

Although examples of the invention are described with reference to use with a MEMS device, the concepts herein described may be applied to any system or device employing a mechanical resonator, and are thus not limited to the specific components or circuits or architecture of FIG. 3 or FIG. 4.

Figure 1:
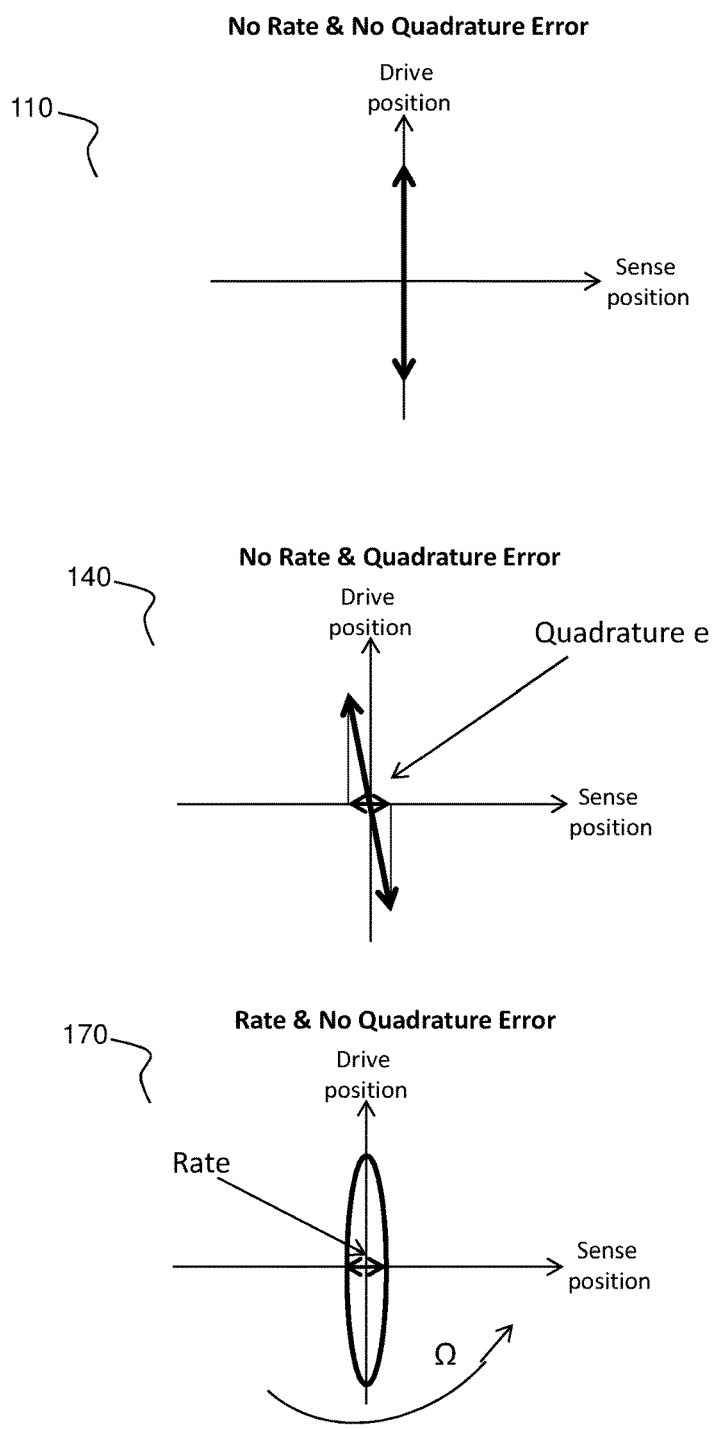
FIG. 1 illustrates drive activation waveforms providing various representations of rate and quadrature error.
Figure 2:
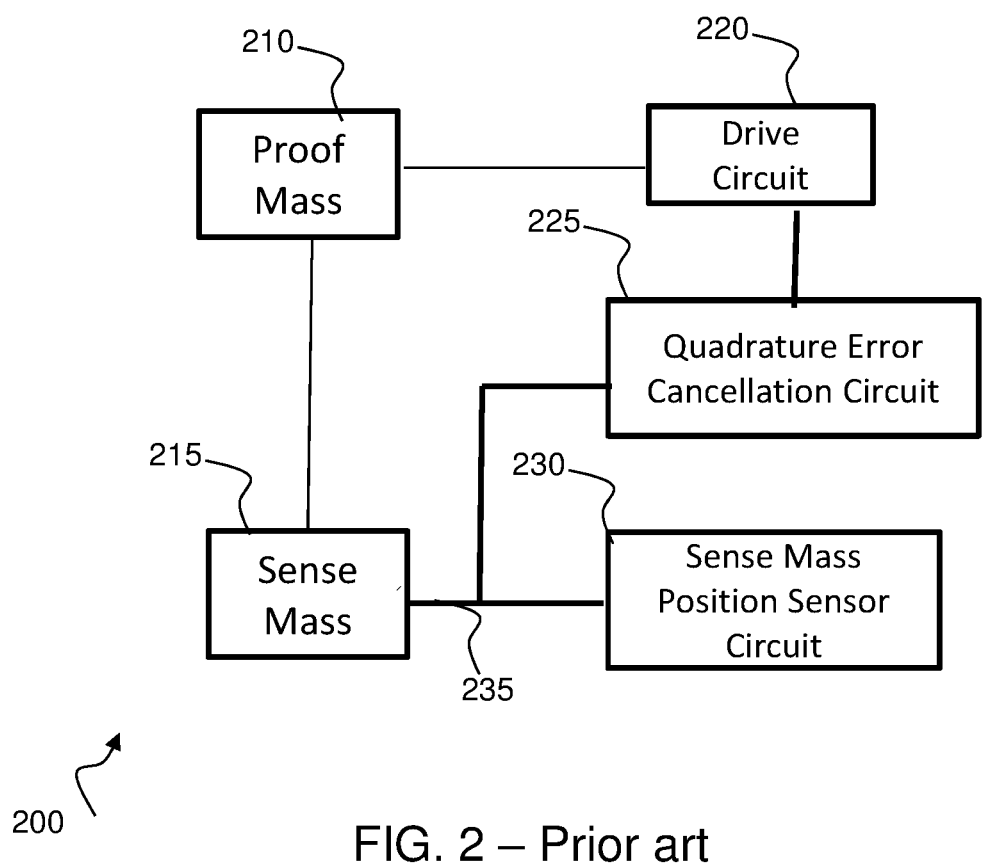
FIG. 2 illustrates a simplified block diagram of the quadrature cancellation apparatus of U.S. Pat. No. 7,290,435 B2.

FIG. 2 illustrates a simplified block diagram 200 of the quadrature cancellation apparatus found in the prior art, which includes a proof mass 210, a sense mass 215, a drive circuit 220, a sense mass position sensor circuit 230 and a quadrature error cancellation circuit 225. The drive circuit 220 vibrates the proof mass at a predetermined frequency in a drive position axis. The sense mass 215 vibrates in concert with the proof mass along an orthogonal position axis to the proof mass vibration. An electrode senses a change in capacitance and inputs this change to the sense mass position sensor circuit 230. Sense mass position sensor circuit 230 senses the amplitude of the vibration of sense mass 215 based on a capacitance signal 235. Quadrature error cancellation circuit 225 generates a quadrature error compensation signal to cancel quadrature error within the capacitance signal 235.

Notably, in U.S. Pat. No. 7,290,435, a digital code that is determined at a production stage is stored in a one-time programmable, non-volatile memory and used to set the amplitude of the quadrature compensating signal. However, as this code is determined at production, it cannot address any subsequent mechanical stress that can occur, once the MEMS device is active in the field. Furthermore, subsequent manufacturing operations (e.g., soldering) to install the gyroscope on a printed circuit board generates new mechanical stress that can modify the already compensated-for quadrature error.

Figure 3:
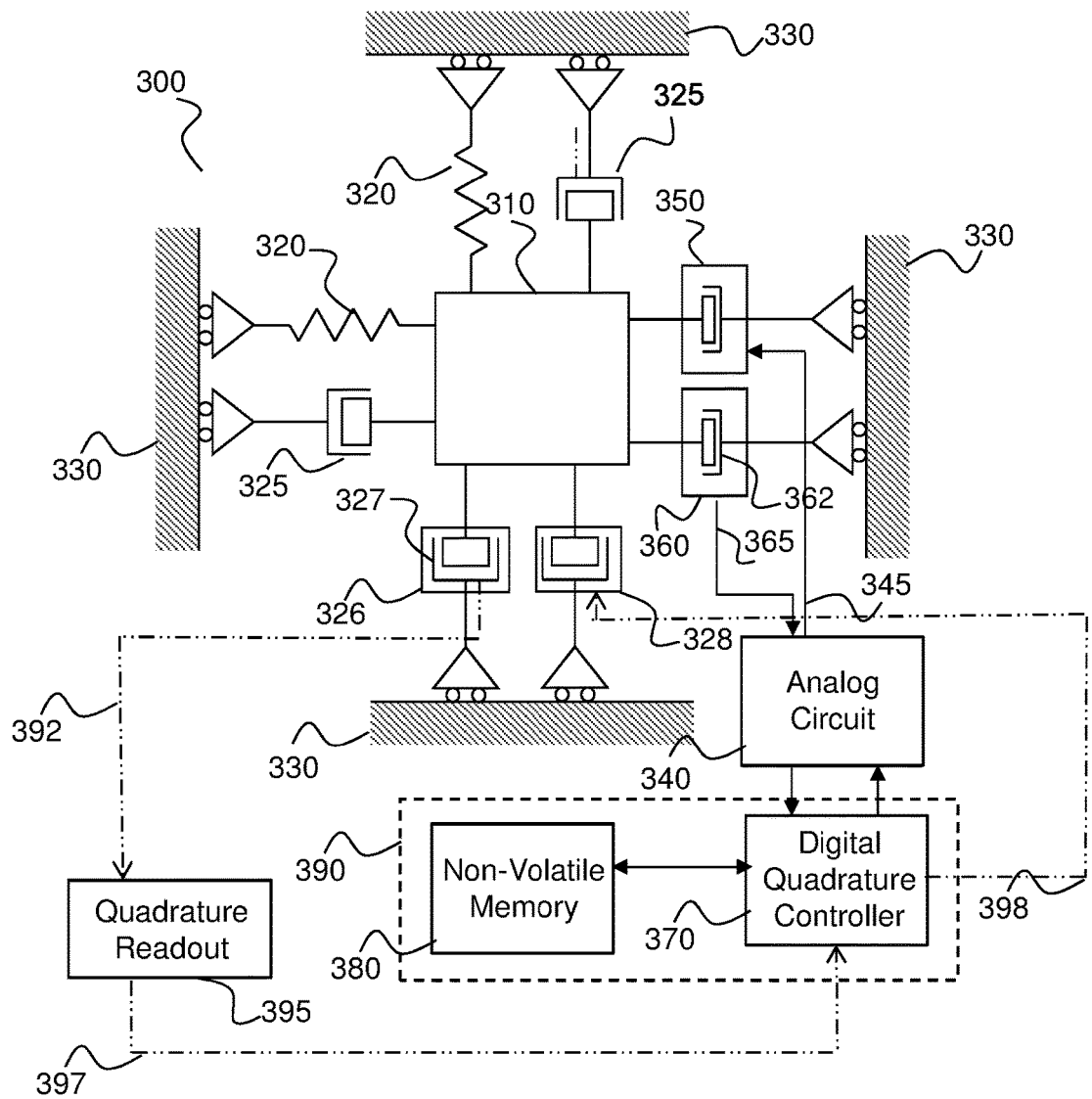
FIG. 3 illustrates a simplified block diagram of an example of a MEMS device employing a digital actuator with a quadrature error control mechanism.

Referring to FIG. 3, there is illustrated a simplified block diagram of an example of a MEMS device 300. Since the Coriolis effect is based on conservation of momentum, a drive-mode circuit is implemented to provoke the oscillation of the proof-mass which is the source of this momentum. The MEMS device 300 includes a vibratory proof-mass 310 suspended by springs 320 and dampened by pistons 325 above one or more substrate(s) 330. An analog circuit 340 generates an actuation signal 345, which drives a drive actuation unit (DAU) 350 of the MEMS device 300 to cause the proof-mass 310 to oscillate. The analog circuit 340 is arranged to control the amplitude of signals and, in some examples, ensure a correct sign of such signals. A drive measurement unit (DMU) 360 of the MEMS device 300 outputs a proof-mass measurement signal 365 including an indication of a capacitance change in the DMU caused by displacement of the proof-mass 310. The proof-mass measurement signal 365 is provided as feedback to the analog circuit 340.

In accordance with embodiments of the present invention, a digital quadrature controller 370 is coupled to the analog circuit 340 to generate a quadrature error compensation signal, which can be a quadrature error cancellation digital word. In some examples, the generated quadrature error compensation signal is based on an extracted or determined quadrature error or extracted sign. Embodiments of the present invention include a mechanism whereby displacement of the proof-mass 310 is sensed by electrodes within sense measurement unit (SMU) 326, in a sensing position axis that is orthogonal to the drive position axis. Sensed signal 392 is generated by sensing electrodes 327 placed orthogonal to the driving electrodes and arranged to identify or pick up vibrations of the proof-mass 310. The sensed signal 392 is passed to a quadrature readout processing module 395.

In some examples, the quadrature readout processing module 395 includes a demodulator running on a quadrature (Q) clock signal (i.e. in phase with the quadrature signal that is being demodulated). By using a synchronised quadrature (Q) clock signal, the demodulator can extract the amount of quadrature error from the proof-mass measurement signal 392. For example, by mixing a quadrature (Q) clock signal with the mechanical resonator measurement signal having a quadrature error, the quadrature error is automatically output. In an alternative example (not shown), a direct sampling of the measurement signal with the proper phase can be performed. A signal 397 identifying an amount of quadrature error is passed to the digital quadrature controller 370.

In some embodiments, the digital quadrature controller 370 includes a signal processor or logic in a form of a state machine. The digital quadrature controller 370 is arranged to cancel or reduce quadrature errors via a feedback loop, for example via a quadrature error compensation signal 398 applied to second actuation unit (SAU) 328 (or other components as illustrated and described further with respect to FIG. 4). Thus, a quadrature error of a MEMS drive proof mass is identified by a sense circuit of the MEMS device and is used to generate a quadrature error compensation signal. The quadrature error compensation signal is applied to the drive circuit of the MEMS device in order to reduce the quadrature error.

In some embodiments, the digital quadrature controller 370 may be arranged to create or adapt a binary search algorithm stored in memory, such as non-volatile memory 380. The binary search algorithm identifies suitable or optimum quadrature compensating signals or settings that compensate for, or reduce, any of various determined quadrature errors. The quadrature error compensation signal is based on an extracted quadrature error from the mechanical resonator measurement signal or, as in the example of FIG. 4, an extracted sign.

A binary search is a relatively easy approach to implement digitally through techniques known in the art. One or more alternative sequence algorithms, such as a linear search, a Fibonacci search technique, etc., can be used to identify suitable or optimum quadrature compensating signals or settings to reduce any of various quadrature errors that may occur in the mechanical resonator measurement signal.

In some embodiments, the digital quadrature controller 370 is arranged to perform a series of tests during production of the MEMS device, or during post-board mounting, in order to determine quadrature compensating signals for various determined quadrature errors incurred by manufacturing activities. The results of these tests, which in some examples can be in a form of multiple digital codes or codewords, can be stored in non-volatile memory 380 for later use. In some embodiments, the digital quadrature controller 370 may be arranged to calibrate the system in the field, during a period when the system is not measuring a Coriolis force (e.g., when the circuit is effectively 'OFF' and not measuring the rate).

In some embodiments, the digital quadrature controller 370, and in some examples the non-volatile memory 380, may be implemented in an integrated circuit 390.

Figure 4:
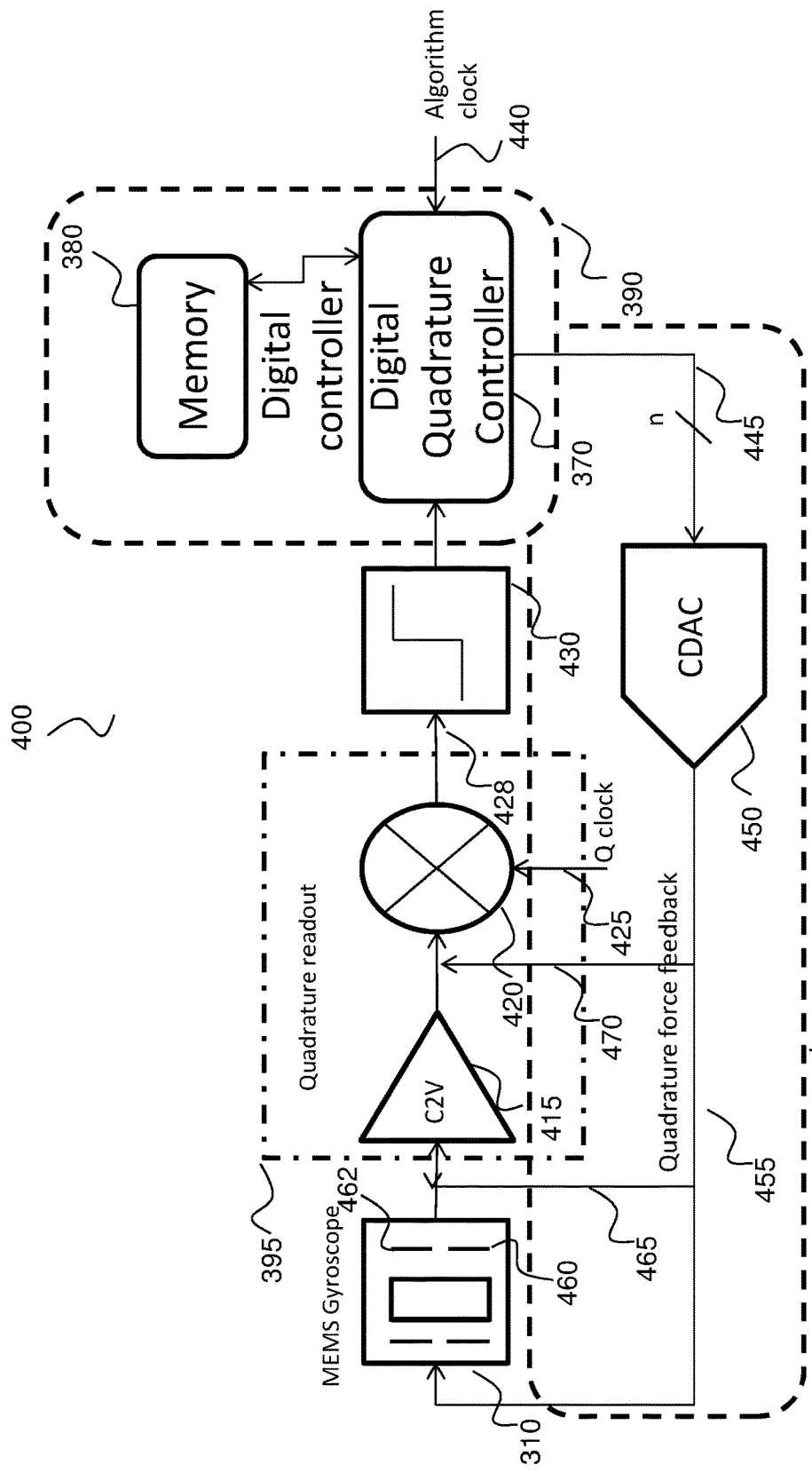
FIG. 4 illustrates a simplified block diagram of an example of a MEMS device employing a control feedback loop used to reduce quadrature error.

Referring now to FIG. 4, a simplified block diagram of an embodiment of a MEMS device 400 employing a control feedback loop to cancel or reduce or compensate for quadrature errors is illustrated. The simplified block diagram of FIG. 4 represents one example of a sense circuit that can be used in the 'sense' portions of FIG. 3. In some embodiments, the use of a control feedback loop, and an associated digital quadrature controller employing a quadrature error compensation algorithm, facilitates implementations suitable for a mechanical or an electrical quadrature error compensation signal to be applied via the feedback loop.

When a supply voltage is applied, the MEMS device 400 starts by turning on the drive loop and the sense circuit as well as any associated circuitry. Once the drive proof-mass(es) is/are vibrating to the correct displacement and velocity, a sense loop is enabled. The MEMS device 400 includes a MEMS gyroscope 310 providing proof-mass displacement output to a quadrature readout processing module 395 via a sense plate or electrode 462. The quadrature readout processing module 395 can operate in either a digital domain, for example with a sigma-delta quadrature demodulator, or an analog domain architecture as shown in FIG. 4.

In the illustrated analog implementation, the quadrature readout processing module 395 includes a 'sense' capacitance to voltage (C2V) converter 415 arranged to convert a sensed capacitance, associated with the sense proof-mass displacement, to a voltage. The C2V converter 415 outputs a mechanical resonator quadrature measurement signal, based on the measured sense proof-mass displacement, to a sense demodulator 420. The sense demodulator 420 is arranged to demodulate the mechanical resonator quadrature measurement signal using a quadrature (Q) clock signal 425 that is synchronous to the mechanical resonator quadrature measurement signal. All signals within the MEMS gyroscope 310 are effectively induced by the drive motion (e.g. drive-mode oscillator). Thus, the mechanical resonator measurement signal, for example as measured at a DMU output, becomes a natural reference signal for the system, and is in phase with quadrature (Q) clock signal 425. In some embodiments, the quadrature clock signal 425 comprises one quadrature (I) clock to a drive circuit (not shown) in order to obtain the rate of the proof mass displacement and the other quadrature (Q) clock 425 is provided to the sense circuit (e.g. the (quadrature) sense demodulator 420 or mixer) to obtain or extract the quadrature error signal.

In the illustrated embodiment, the sense demodulator 420 is arranged to output a sign that is representative of the quadrature error of the mechanical resonator quadrature measurement signal. In the example of using a binary search algorithm, only the sign of the quadrature error is needed. However, the sense demodulator 420 can provide the full value of the remaining quadrature error, provided that this error does not exceed the total range of the sense circuit. With the sign only of the remaining quadrature error, the binary search algorithm is able to toggle each compensation bit, one by one, and work its way down from the most significant bit (MSB) to the least significant bit (LSB). In this manner, the binary search algorithm progressively and iteratively (as described with reference to FIG. 5 and FIG. 6) sets the compensations bits to '1' or '0' from MSB to LSB and the quadrature error will progressively be cancelled.

Thus, in this embodiment, a quadrature error signal output from the sense demodulator 420 is in a form of an extracted sign 428 that is representative of the quadrature error, such that a simple binary search algorithm may be employed. In this manner, and as described further with respect to FIG. 5 and FIG. 6, a binary search algorithm may use the extracted sign 428 to identify a suitable quadrature error compensation signal to be employed.

The extracted sign 428 that is representative of the quadrature error is input to a threshold comparator 430. The threshold comparator outputs a binary signal to the digital quadrature controller 370 based on whether the input extracted sign 428 exceeds or falls below one or more threshold(s). A digital quadrature controller 370 manages the MEMS device 400 and is coupled to an output of the threshold comparator 430. As with all synchronous digital systems, the digital quadrature controller 370 includes a clock input for pulsing its digital operations. The digital quadrature controller 370 runs an algorithm, for example the algorithm that is described with reference to FIG. 5 and FIG. 6. The algorithm identifies a suitable quadrature error compensation signal that can cancel or reduce any quadrature errors produced in a mechanical resonator measurement signal by the MEMS device 400. In some examples, the algorithm within the digital quadrature controller 370 may be a simple binary search algorithm that can be arranged to search for an improved or best setting. The quadrature error compensation signal is then applied to either the mechanical resonator directly, or within a signal processing chain of FIG. 4, in order to reduce or cancel any quadrature error.

In some instances, the quadrature signal may easily be 100 to 1000 times higher than the largest rate signal. In such a situation, the quadrature signal will saturate the sense C2V converter 415. Hence, the quadrature error must be reduced to a level that is lower than the full scale range of the rate signal.

In some embodiments, the digital quadrature controller 370 can be arranged to generate a quadrature cancellation digital word, based on the extracted quadrature error from the mechanical resonator measurement signal using a quadrature clock, or the extracted sign that is representative of the quadrature error in this example of FIG. 4.

In some embodiments (not shown), the digital quadrature controller 370 can include a signal processor or logic in a form of a state machine that is arranged to cancel quadrature errors via a feedback loop 442. The feedback loop between the digital quadrature controller 370 and the MEMS gyroscope 310 includes a cancellation digital to analog converter (CDAC) 450 arranged to receive a digital word 445 and convert the digital word to a quadrature error compensation signal 455.

The quadrature error compensation signal 455 can take one or more of a number of forms. For example, in applying a quadrature error compensation signal mechanically, the feedback path may be arranged to control an electrostatic force that is applied to the mechanical resonator through one or more additional plates or electrodes 460 associated with the MEMS drive and coupled to the MEMS gyroscope 310, and that force causes a mechanical adjustment that results in quadrature error to be suppressed. In a further example, in applying a quadrature error compensation signal capacitively, the feedback path may be coupled 465 to the input sense C2V converter 415 such that a capacitive signal may be applied that is inversely proportional to the quadrature error. In a yet further example, in applying a quadrature error compensation signal electrically, the feedback path may be coupled 470 to the output of the sense C2V converter 415 such that an electrical signal may be applied that is the opposite of the quadrature error signal. Each one of the above approaches for implementing the compensation has its own advantages and drawbacks and can be selected according to the specific application.

The quadrature error compensation signal 455 is applied to the MEMS gyroscope 310 in such a manner that the quadrature errors generated in the MEMS device 400 are substantially reduced or cancelled based on the determination by the digital quadrature controller 370.

In some embodiments, the MEMS device 400 is arranged to produce a quadrature cancellation digital word to cancel quadrature errors generated by the MEMS gyroscope 310 in order to auto-trim the quadrature error at a boot-time, sometimes referred to as a 'power-on-reset time. In this manner, even should the MEMS technology be sensitive to external mechanical stress or temperature stress, the MEMS vibrating part is calibrated at each boot operation. Furthermore, in this example, no trimming may be required at a production level, as successive reduction of the quadrature error may be achieved subsequent to the MEMS gyroscope being board mounted.

In some embodiments, the digital quadrature controller 370, and in some examples the non-volatile memory 380, may be implemented in an integrated circuit 390.

Figure 5:
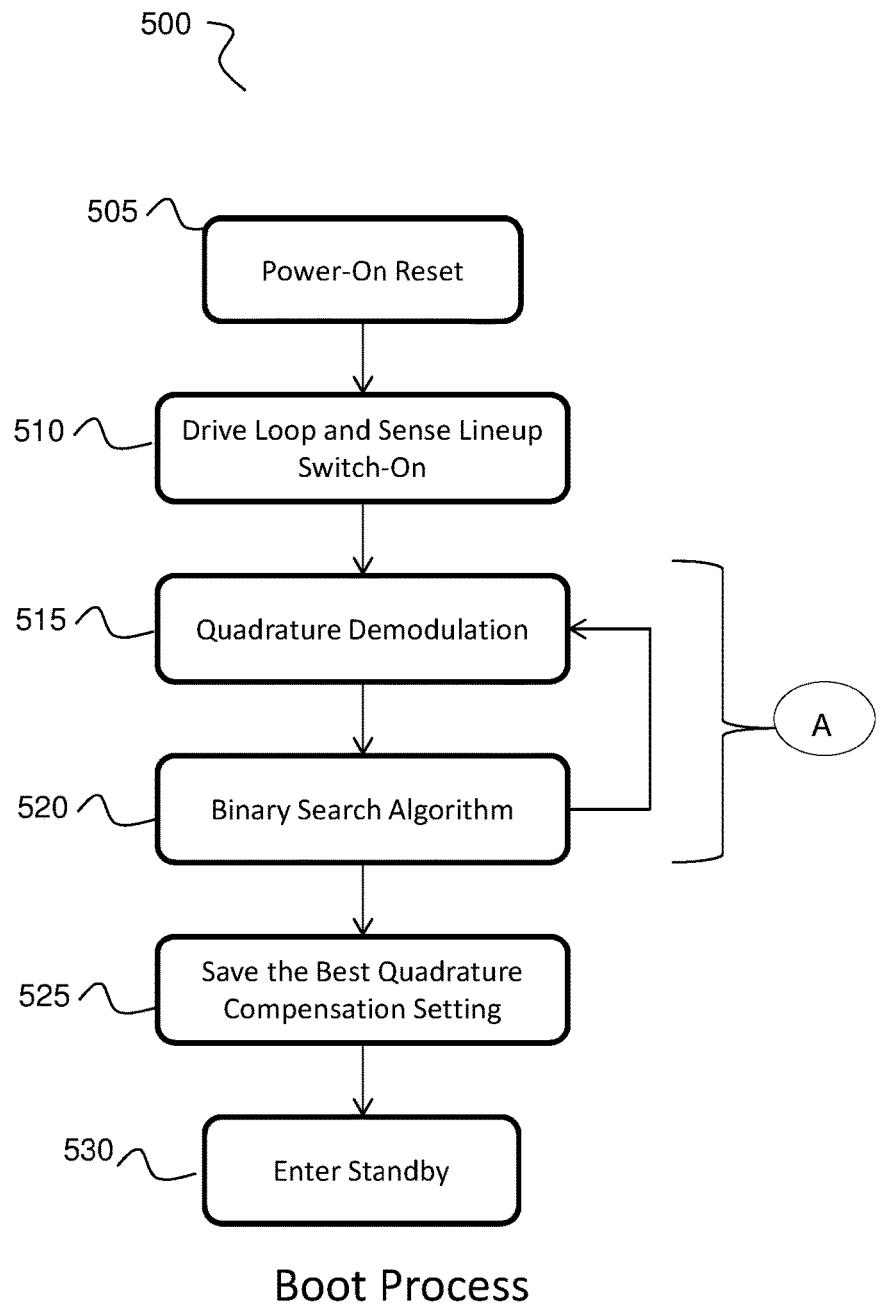
FIG. 5 illustrates a simplified flowchart of an example of a boot sequence of a MEMS device.

FIG. 5 illustrates a simplified flowchart 500 of an example of a boot sequence of a micro-electro-mechanical system (MEMS) device. The flowchart commences in 505 with a switch on of the MEMS device. The MEMS drive loop and the MEMS sense line-up are turned on in 510 and quadrature demodulation of the proof mass signal of the MEMS device performed at 515. A quadrature demodulated proof mass signal is then used in a binary search algorithm in 520. Once the binary search algorithm has been run, as explained in the example flowchart of FIG. 6, the result of the binary search algorithm identifies an improved or optimum quadrature error compensating setting or generates a quadrature error compensating signal in 525, which may be stored in memory, for example stored in memory 380 of FIG. 3 and FIG. 4. Once the improved or optimum quadrature error compensating setting has been determined and quadrature compensation applied in 525, the MEMS device can enter a stand-by mode at 530.

Figure 6:
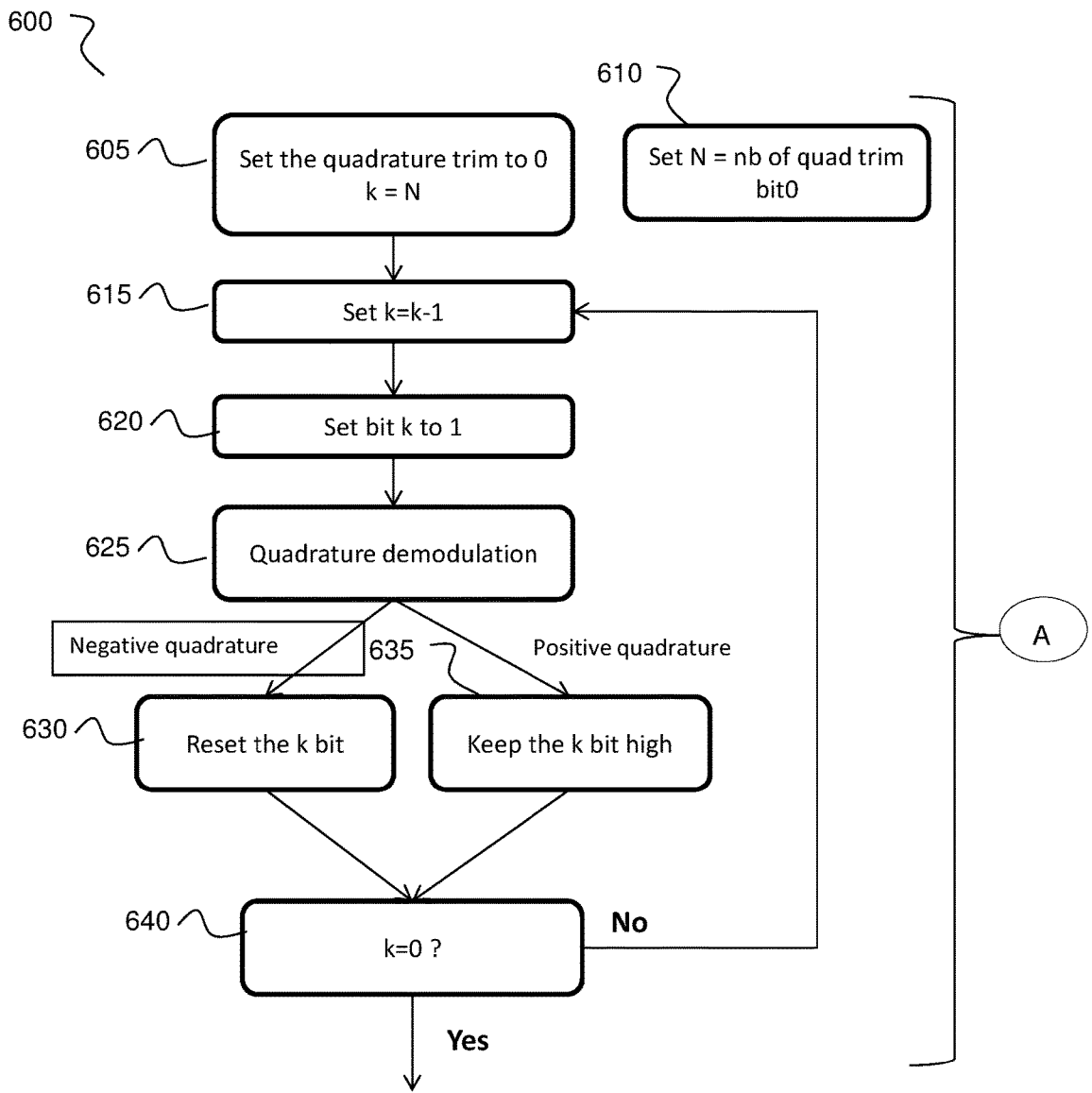
FIG. 6 illustrates a simplified flowchart of an example of a method to perform a binary search algorithm looking for a best quadrature cancellation word in a MEMS device.

FIG. 6 illustrates a simplified flowchart 600 of an example of a method to perform a binary search algorithm using quadrature demodulation in order to identify a best quadrature error cancellation codeword. This includes the binary search algorithm in 520 and quadrature demodulation 515 of FIG. 5 identified as 'A'. The flowchart 600 starts at 605 with a counter ('k') set to 'N' and the quadrature trim set to '0', as this example of a suitable binary search algorithm starts in the middle of the potential range of quadrature correction. As the quadrature is a signed error, '0' is in the middle. In some examples, the counter 'N' may be configured as the number of a quadrature bit in 610, for example a number of a quadrature bit of CDAC 450 in FIG. 4. In this example, this is the number of a bit of the actuator that corrects the quadrature error. In 615, the counter is decremented and a $k^{th}$ bit set to '1' at 620. At 625, quadrature demodulation is performed on the proof mass signal.

Quadrature demodulation 625 produces either a negative quadrature output, following which the 'k' bit is reset at 630, or a positive quadrature output, following which the 'k' bit is kept high at 635. Hence, only a sign that is representative of the quadrature error is needed to be determined by the quadrature demodulation. Subsequent to either a negative quadrature output at 630 or a positive quadrature output at 635, a determination is made as to whether the 'k' counter is at '0' in 640. If the determination at 640 is that the 'k' counter is at '0', then the process loops back to 615 and the counter is again decremented. If the determination at 640 is that the 'k' counter is not at '0', then the flowchart reverts to a saving of the best codeword, for example by reverting to 525 of FIG. 5.

As an explanatory example of the simplified flowchart 600 of an example of a method to perform a binary search algorithm let us take an example of the counter N=3 (where the CDAC is over 3 bits in length) and the codeword solution is '101'. Thus, at 605, counter ('k') is set to 'N' (e.g. '3') and the quadrature trim set to '0'. Upon decrementing the counter, 'k:=2' at 615 and the bit number-2 is set to '1' at 620. Subsequently, at 635, the positive quadrature bit number-2 is '1', such that the counter with k=2 is false at 640. The example binary search algorithm then loops back with the counter 'k' further decremented to 'k:=1' at 615. Thereafter, bit number-1 is set to a '1' at 620. Subsequently, at 635, the negative quadrature bit number-1 is '0', such that the counter with k=1 is false at 640. The example binary search algorithm then loops back with the counter 'k' further decremented to 'k:=0' at 615. Thereafter, bit number-0 is set to a '1' at 620. Subsequently, at 635, the positive quadrature bit number-0 is '1', such that the counter with k=0 is true, at 640, and the flowchart exits by reverting back to FIG. 5. In this manner, a codeword of '101' is identified as the best quadrature error cancellation codeword.

In some embodiments, a sense demodulator is arranged to use a quadrature clock to extract a quadrature error signal from a mechanical resonator measurement signal. An output of the sense demodulator can be input to a threshold comparator, such that the threshold comparator outputs a sign that is representative of the quadrature error signal to the digital quadrature controller. The digital quadrature controller can be arranged to employ a binary search algorithm to generate a quadrature error compensation signal to reduce a quadrature error of the mechanical resonator measurement signal.

In some embodiments, the digital quadrature controller may be arranged to compensate for any quadrature error when the system is not measuring a Coriolis force.

In some embodiments, the quadrature error signal may be removed from the MEMS rate signal at the demodulation process, and notably post-production. In some embodiments, the digital quadrature controller may be arranged to reduce any quadrature error at system boot or at each system boot, for example each time a user switches on the MEMS device. Thus, in some embodiments, the digital quadrature controller may remove any quadrature error due to non-orthogonal MEMS masses movement within the MEMS device.

In some embodiments, the digital quadrature controller may be arranged to perform a series of tests during production of the MEMS device, post-board mounting to determine quadrature compensating signals to reduce various determined quadrature errors. The results of these tests, which in some examples is in the form of multiple digital codes or codewords, may be stored in a non-volatile memory for later use.

In some embodiments, in addition or in the alternative, the digital quadrature controller can remove any additional quadrature error due to mechanical post-board-mounting stress imposed on the MEMS device and any stress evolution during the life-cycle of the final MEMS device product.

In some embodiments, the digital quadrature controller can be arranged to avoid any quadrature error trimming during product testing, thereby speeding up the product test time.

In the foregoing specification, the invention has been described with reference to specific examples of embodiments of the invention described and illustrated in the drawings. It will, however, be evident that various modifications and changes may be made therein, for example implemented using other electronic components and circuits known to those skilled in the art and without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on an integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

The word 'comprising' does not exclude the presence of other elements or steps than those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Also, the use of phrases such as 'or' within the description can be interpreted either exclusively or inclusively, depending upon which is broader in terms of the context described. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:
1. A system comprising:
a mechanical resonator;
an analog circuit, coupled to the mechanical resonator, and comprising a sense demodulator configured to
receive a mechanical resonator measurement signal having a quadrature error from the mechanical resonator, and extract the quadrature error signal from the mechanical resonator measurement signal using a quadrature clock; and a threshold comparator, coupled to an output of the sense demodulator, and configured to output a sign that is representative of the quadrature error signal;

a digital quadrature controller, coupled to the threshold comparator, and configured to generate a quadrature error compensation signal from the extracted quadrature error signal, and apply the quadrature error compensation signal to the mechanical resonator or the mechanical resonator measurement signal to reduce quadrature error in the mechanical resonator measurement signal.

2. The system of claim 1, wherein the digital quadrature controller is configured to generate a quadrature error compensation signal to reduce quadrature error when the system is not measuring a Coriolis force.

3. The system of claim 1, wherein the digital quadrature controller is configured to generate a quadrature error compensation signal to reduce any quadrature error at system boot.

4. The system of claim 3, wherein the digital quadrature controller is configured to generate a quadrature error compensation signal to reduce any quadrature error at each system boot.

5. The system of claim 1, wherein the digital quadrature controller is configured to employ a binary search algorithm to generate a quadrature error compensation signal to reduce a quadrature error of the mechanical resonator measurement signal.

6. The system of claim 1, wherein the digital quadrature controller is coupled to the mechanical resonator via a feedback loop.

7. The system of claim 6, wherein the feedback loop comprises a cancellation digital-to-analog converter (CDAC) configured to receive a digital word from the digital quadrature controller, and convert the digital word to the quadrature error compensation signal to be applied to the mechanical resonator or the mechanical resonator measurement signal to reduce quadrature error in the mechanical resonator measurement signal.

8. The system of claim 6, wherein the mechanical resonator comprises one or more plates or electrodes and wherein the digital quadrature controller applies the quadrature error compensation signal to the mechanical resonator via the feedback loop through a mechanical adjustment induced by the one or more plates or electrodes.

9. The system of claim 6, wherein the mechanical resonator measurement signal is a capacitive signal and the analog circuit comprises a sense capacitance to voltage converter configured to receive the capacitive signal, wherein the digital quadrature controller applies the quadrature error compensation signal to adjust a capacitance associated with the mechanical resonator measurement signal input to the sense capacitance to voltage converter by an amount that is inversely proportional to the quadrature error.

10. The system of claim 6, wherein the mechanical resonator measurement signal is a capacitive signal and the analog circuit comprises a sense capacitance to voltage converter configured to receive the capacitive signal, wherein the digital quadrature controller is configured to apply an electrical quadrature error compensation signal that cancels the quadrature error at an output of the sense capacitance to voltage converter.

11. The system of claim 1, wherein the digital quadrature controller is configured to generate a quadrature error compensation signal to reduce a quadrature error due to at least one of the following:

a non-orthogonal movement of the mechanical resonator within a micro-electro-mechanical system, and mechanical post-board-mounting stress having affected a movement of the mechanical resonator.

12. The system of claim 11 wherein the system is a vibrating micro-electro-mechanical system gyroscope and the mechanical resonator is a proof-mass.

13. An integrated circuit comprising the digital quadrature controller according to claim 1.

14. A method of generating a quadrature error compensating signal for a mechanical resonator within a micro-electro-mechanical system (MEMS) device, the method comprising:

extracting a quadrature error signal from a mechanical resonator measurement signal using a quadrature clock;

generating a quadrature error compensating signal based on the extracted quadrature error signal, wherein generating the quadrature error compensating signal comprises generating a quadrature error compensation signal through a binary search algorithm that successively reduces a quadrature error of the mechanical resonator measurement signal; and applying the quadrature error compensating signal to the mechanical resonator or the mechanical resonator measurement signal.

15. The method of claim 14 wherein generating a quadrature error compensating signal based on the extracted quadrature error signal is performed during a system boot operation.

16. The method of claim 14 wherein generating a quadrature error compensating signal comprises:

generating by the binary search algorithm a quadrature error cancellation codeword; and converting the quadrature error cancellation codeword to the quadrature error compensation signal.

17. The method of claim 14, wherein generating a quadrature error compensation signal comprises iteratively:

determining a sign that is representative of the quadrature error signal;

using the determined sign in the binary search algorithm to reduce a quadrature error of the mechanical resonator measurement signal.

* * * * *